US012659148B2

(12) United States Patent
Nadzlan et al.

(10) Patent No.: US 12,659,148 B2
(45) Date of Patent: Jun. 16, 2026

(54) SYSTEM AND METHOD FOR DIRECTING A COMMUNICATION ON A COMMON CHANNEL TO A SPECIFIC GROUP

(71) Applicant: MOTOROLA SOLUTIONS, INC., Chicago, IL (US)

(72) Inventors: Muhammad Hadri Bin Nadzlan, Bayan Lepas (MY); Muhammad Fitri Zainudin, Bandar Baru Bangi (MY); Boon Teong Ooi, Bayan Lepas (MY); Wei Sheng Chong, Georgetown (MY)

(73) Assignee: MOTOROLA SOLUTIONS, INC., Chicago, IL (US)

( * ) Notice: Subject to any disclaimer, the term of this patent is extended or adjusted under 35 U.S.C. 154(b) by 84 days.

(21) Appl. No.: 18/938,346

(22) Filed: Nov. 6, 2024

(65) Prior Publication Data

US 2026/0128878 A1 May 7, 2026

(51) Int. Cl.
| | |
|---|---|
| *H04L 9/08* | (2006.01) |
| *H04W 12/088* | (2021.01) |
| *H04W 12/10* | (2021.01) |

(52) U.S. Cl.
CPC ............ *H04L 9/088* (2013.01); *H04L 9/0819* (2013.01); *H04L 9/0822* (2013.01); *H04L 9/0833* (2013.01); *H04L 2209/16* (2013.01); *H04W 12/088* (2021.01); *H04W 12/10* (2013.01)

(58) Field of Classification Search
None
See application file for complete search history.

(56) References Cited

U.S. PATENT DOCUMENTS

| | | | |
|---|---|---|---|
| 8,824,684 | B2 | 9/2014 | Calcaterra et al. |
| 10,321,278 | B2 | 6/2019 | Proctor |
| 11,272,328 | B1 | 3/2022 | Paras Ram et al. |
| 12,015,581 | B1 | 6/2024 | Bravo et al. |
| 2009/0024845 | A1 | 1/2009 | Benshetler et al. |

(Continued)

FOREIGN PATENT DOCUMENTS

| | | | | |
|---|---|---|---|---|
| CN | 110023976 | B | * 9/2023 | ......... G06Q 30/0269 |
| JP | 2005080054 | A | * 3/2005 | |

(Continued)

OTHER PUBLICATIONS

The International Search Report and the Written Opinion, corresponding patent application serial No. PCT/US2025/052028, filed:Oct. 22, 2025, mailed: Jan. 28, 2026, all pages.

*Primary Examiner* — Ali H. Cheema

(57) ABSTRACT

Techniques for directing a communication on a common communications channel to a specific group are provided. An Artificial Intelligence (AI) system receives a communication from a first device. Keywords are identified in the communication that indicate the communication is intended for a subset of users monitoring the shared communications channel. An encryption key associated with the subset of users is retrieved. The communication is encrypted using the encryption key. The encrypted communication is sent over the common communications channel. Only a second device associated with the subset of users and including the encryption key associated with the subset of users is able to decrypt the encrypted communication.

12 Claims, 5 Drawing Sheets

(56) References Cited

U.S. PATENT DOCUMENTS

| | | | | |
|---|---|---|---|---|
| 2012/0014522 A1 * | 1/2012 | Henry | .................. | H04N 7/1675 |
| | | | | 380/200 |
| 2020/0004970 A1 * | 1/2020 | Wang | .................. | H04L 63/0876 |
| 2021/0056970 A1 * | 2/2021 | Jain | ....................... | G06F 16/243 |
| 2022/0086615 A1 | 3/2022 | Kee et al. | | |
| 2023/0319513 A1 | 10/2023 | Meredith et al. | | |
| 2023/0325590 A1 * | 10/2023 | Shevchenko | ......... | G06F 40/186 |
| 2024/0142973 A1 * | 5/2024 | Cella | ..................... | G06N 20/00 |
| 2025/0053735 A1 * | 2/2025 | Shevchenko | ........... | G06F 40/30 |

FOREIGN PATENT DOCUMENTS

| | | | | | |
|---|---|---|---|---|---|
| KR | 102147619 B1 * | 8/2020 | .............. | G06N 3/08 |
| WO | WO-2012141443 A2 * | 10/2012 | ............. | G06Q 10/40 |

* cited by examiner

200

205 — RECEIVIE, BY AN ARTIFICIAL INTELLIGENCE (AI) SYSTEM A COMMUNICATION FROM A FIRST DEVICE

210 — IDENTIFY A KEYWORD IN THE COMMUNICATION THAT INDICATES THE COMMUNICATION IS INTENDED FOR A SUBSET OF USERS MONITORING THE COMMON COMMUNICATIONS CHANNEL

215 — THE KEYWORD IS A PHRASE

220 — RETRIEVE AN ENCRYPTION KEY ASSOCIATED WITH THE SUBSET OF USERS

225 — THERE ARE AT LEAST TWO SUBSETS OF USERS, WHEREIN EACH OF THE AT LEAST TWO SUBSETS OF USERS HAVE DIFFERENT KEYWORDS, WHEREIN EACH OF THE AT LEAST TWO SUBSETS OF USERS IS ASSOCIATED WITH A DIFFERENT ENCRYPTION KEY

230 — ENCRYPT THE COMMUNICATION USING THE ENCRYPTION KEY

235 — THE ENCRYPTION IS NOT PERFORMED ON A SUBSEQUENT COMMUNICATION WHEN THE KEYWORD IS NOT IDENTIFIED

240 — SEND THE ENCRYPTED COMMUNICATION OVER THE COMMON COMMUNICATIONS CHANNEL, WHEREIN ONLY A SECOND DEVICE ASSOCIATED WITH THE SUBSET OF USERS AND INCLUDING THE ENCRYPTION KEY ASSOCIATED WITH THE SUBSET OF USERS IS ABLE TO DECRYPT THE ENCRYPTED COMMUNICATION

245 — THE FIRST AND SECOND DEVICE ARE PART OF A LAND MOBILE RADIO (LMR) SYSTEM

250 — DECRYPTING THE COMMUNICATION BY THE SECOND DEVICE

255 — UNMUTING THE SECOND DEVICE TO PLAYOUT THE COMMUNICATION

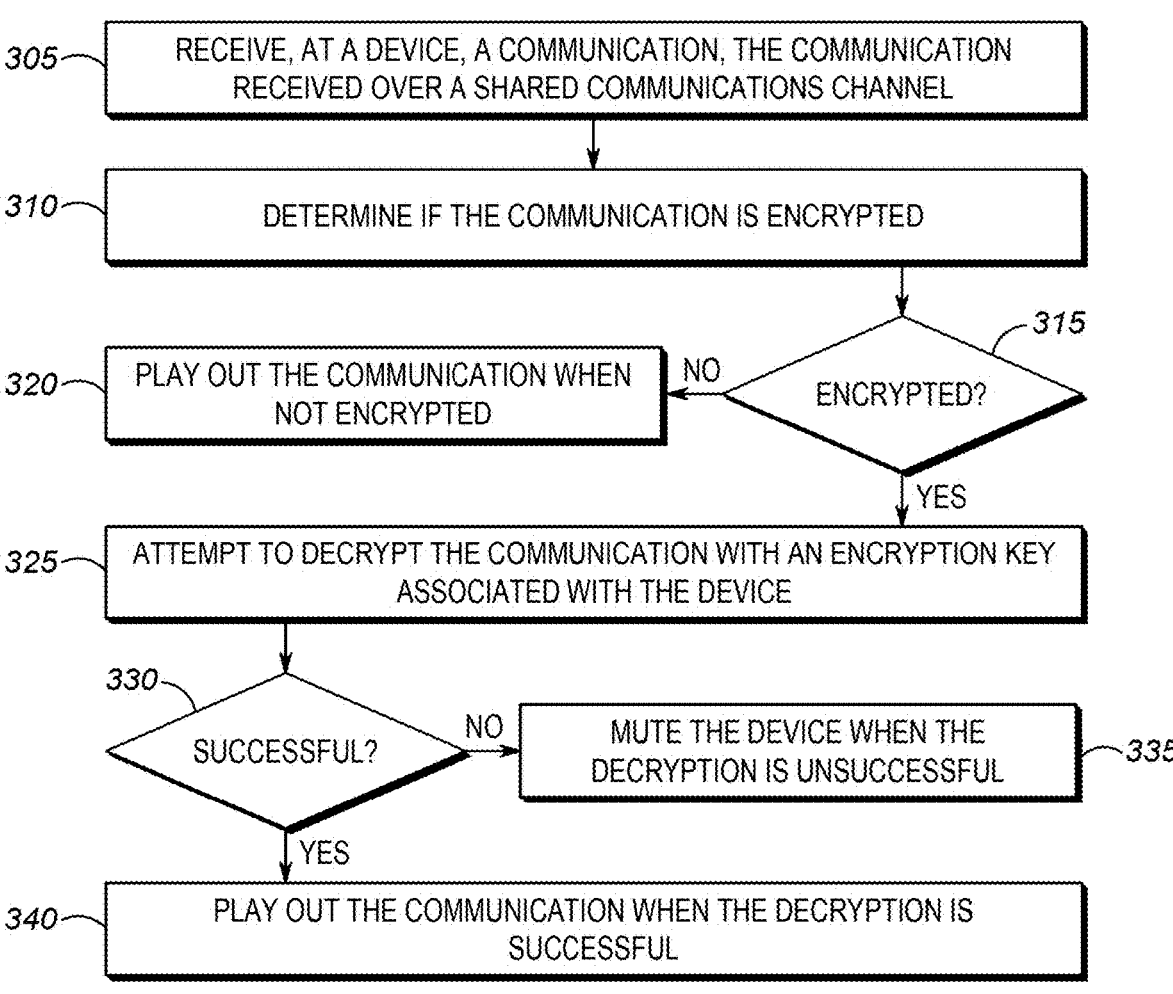

305 — RECEIVE, AT A DEVICE, A COMMUNICATION, THE COMMUNICATION RECEIVED OVER A SHARED COMMUNICATIONS CHANNEL

310 — DETERMINE IF THE COMMUNICATION IS ENCRYPTED

315 — ENCRYPTED?

320 — PLAY OUT THE COMMUNICATION WHEN NOT ENCRYPTED

NO

YES

325 — ATTEMPT TO DECRYPT THE COMMUNICATION WITH AN ENCRYPTION KEY ASSOCIATED WITH THE DEVICE

330 — SUCCESSFUL?

NO

335 — MUTE THE DEVICE WHEN THE DECRYPTION IS UNSUCCESSFUL

YES

340 — PLAY OUT THE COMMUNICATION WHEN THE DECRYPTION IS SUCCESSFUL

_FIG. 3_

SYSTEM AND METHOD FOR DIRECTING A COMMUNICATION ON A COMMON CHANNEL TO A SPECIFIC GROUP

BACKGROUND

Public safety first responders (e.g. police, firefighters, emergency medical services (EMS), etc.) typically utilize highly reliable wireless communications that are referred to as Land Mobile Radio (LMR) systems. Some examples of LMR systems can include Project 25 (P25), TETRA, or other types of mobile radio systems. These systems can be either analog or digital. The systems can also be conventional (e.g. different channels defined by different radio frequencies, etc.) or trunked (e.g. a radio frequency is dynamically assigned when a call is placed). The systems are typically half-duplex Push-to-Talk (PTT) systems. In a PTT system, users are typically divided into groups, which may be referred to as talkgroups. When a user wishes to communicate, they press a PTT button on their radio device. In trunked systems, the user may wait for a signal referred to as a talk permit tone that indicates a communication channel is assigned before speaking, while in a conventional system, the user may simply begin speaking.

Different types of users are generally segregated into different talkgroups. A talkgroup is a collection of users that should all receive a PTT transmission. For example, a separate talkgroup may exist for police, fire, and EMS. If a police officer presses a PTT button on his radio and begins speaking, the communication is only played out by others in the same talkgroup (e.g. other police officers, etc.). In some cases, for a particular incident, it is possible for various talkgroups to be patched together. For example, a talkgroup may be created for both police and fire, and all police officers and firemen are added to that talkgroup. When a user in the talkgroup initiates a PTT call, all users that are included in the talkgroup will hear the communication.

BRIEF DESCRIPTION OF THE SEVERAL VIEWS OF THE DRAWINGS

In the accompanying figures similar or the same reference numerals may be repeated to indicate corresponding or analogous elements. These figures, together with the detailed description, below are incorporated in and form part of the specification and serve to further illustrate various embodiments of concepts that include the claimed invention, and to explain various principles and advantages of those embodiments.

FIG. 2 is an example of a flow chart of an implementation of the techniques described herein from a network perspective.

FIG. 3 is an example of a flow chart of an implementation of the techniques described herein from a radio device perspective.

Figure 1:
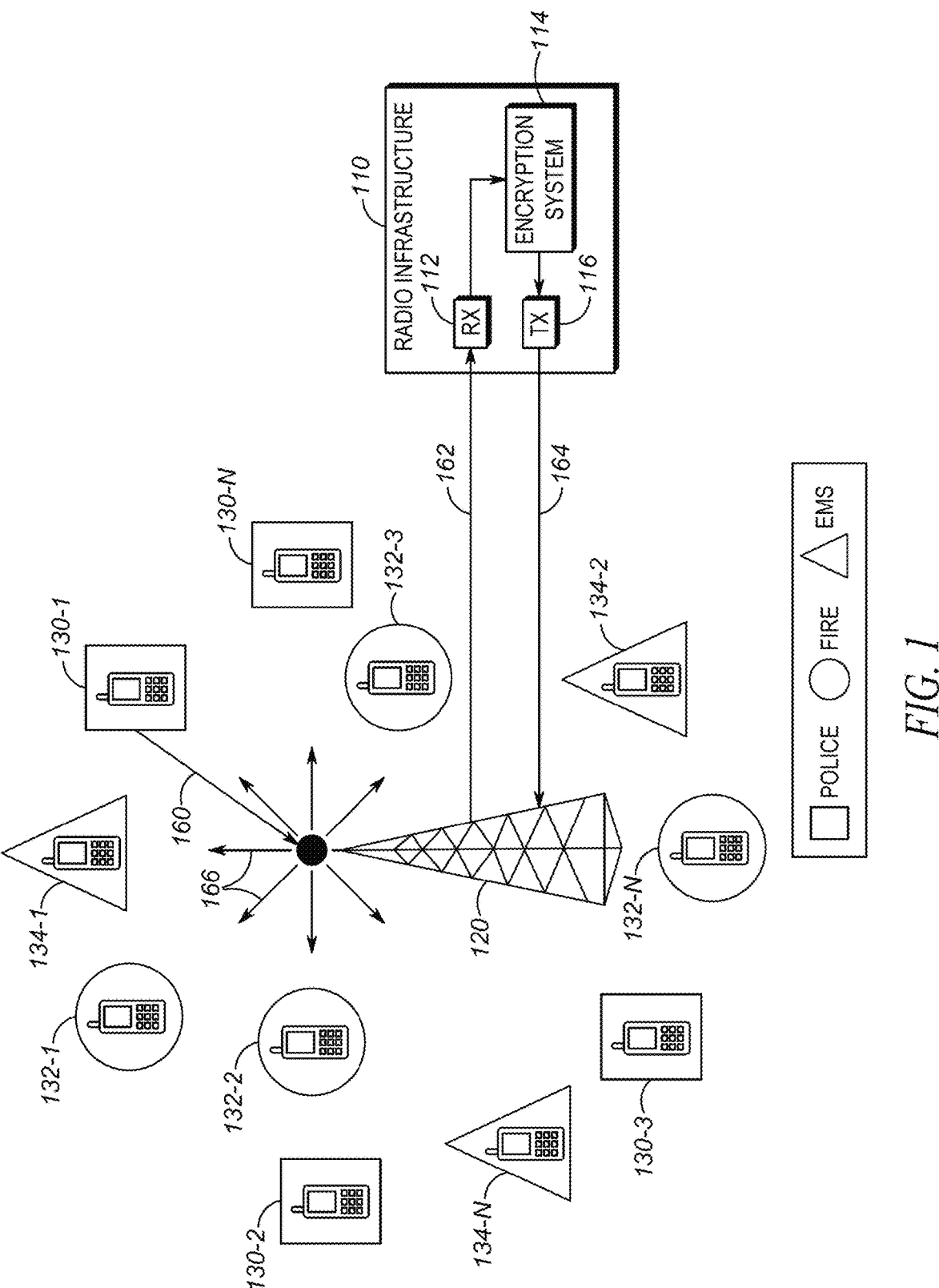
FIG. 1 is an example of a system wherein the directing a communication on a common channel to a specific group techniques described herein may be implemented.

Skilled artisans will appreciate that elements in the figures are illustrated for simplicity and clarity and have not necessarily been drawn to scale. For example, the dimensions of some of the elements in the figures may be exaggerated relative to other elements to help improve understanding of embodiments of the present disclosure.

The system, apparatus, and method components have been represented where appropriate by conventional symbols in the drawings, showing only those specific details that are pertinent to understanding the embodiments of the present disclosure so as not to obscure the disclosure with details that will be readily apparent to those of ordinary skill in the art having the benefit of the description herein.

DETAILED DESCRIPTION OF THE INVENTION

In some cases, different types of users may all be placed in the same talkgroup. For example, in a situation where first responders from multiple jurisdictions are working together to respond to a large incident (e.g. mutual aid situations, etc.) each user's radio may be configured with talkgroups for their home jurisdiction, which maybe different than the jurisdiction in which they are responding. There may be no time to reconfigure each radio to use the talkgroups that are defined in the current jurisdiction. In other cases, for ease of maintenance, all radio users may be placed in the same talkgroup to avoid having to maintain different talkgroups. In some cases, it may be desirable to have all users have the ability to speak with all other users. The particular reason why all users are placed in the same talkgroup is unimportant. What should be understood is that a talkgroup may exist that is used by all responders, regardless of role.

Regardless of the reason why all users are placed in the same talkgroup, a problem arises when a communication is only intended for a subset of the users. For example, if police, fire, and EMS responders are all placed in a single talkgroup, all communications will be heard by all people. This may cause a problem when the communication is not relevant to all users. For example, if the police wish to communicate about something law enforcement related, the fire and EMS personnel on the talkgroup will also receive this communication. In the best case, this means that the fire and EMS responders are distracted by a communication that is not relevant to their role. In the worst case, this may mean that the fire and EMS responders hear police communication that includes information that should not be shared with those responders.

The techniques described herein solve this problem. For each defined group of users (e.g. police, fire, EMS, etc.) there may be a keyword or phrase associated with the group. That keyword or phrase may be associated with an encryption key that is configured into the radio of members of the group of users. The radio system monitors each communication to detect the presence of the keyword. Upon detection of the presence of the keyword or phrase in the communication, the radio system encrypts the communication with the encryption key associated with the keyword or phrase. The communication is then sent to all users of the talkgroup. Only those users whose radios have been configured with the encryption key associated with the keyword or phrase are able to decrypt the communication. All other user's radios, upon determining they are unable to decrypt the communication, will simply remain muted. Thus, the communication will only be played out by the users associated with the keyword or phrase.

The techniques described herein advantageously do not require that the users be assigned to separate talkgroups based on role, thus easing the configuration process. Furthermore, the user initiating the communication is not required to switch to a different talkgroup associated with the keyword. The user initiating the communication is relieved from having to know anything about the users on the talkgroup. For example, the user initiating the communication does not need to select the users of the talkgroup that will receive the communication. In fact, the user initiating the communication need not even know if any member associated with the keyword are using the shared communications channel.

The encryption key configuration is also simplified. When a user joins the talkgroup of the shared communications channel, the radio is configured with encryption keys associated with the keywords or phrases associated with the role of that user. There is not a separate encryption key required for each user. The techniques described herein also rely on the single shared communications channel, as opposed to requiring a different communications channel for each user. The use of detecting the keyword or phrase directly from the audio of the communication channel further relieves the user initiating the communication from having to manually adjust settings of the radio (e.g. using a channel knob to change channel, etc.).

A method for directing a communication on a common communications channel to a specific group is provided. The method includes receiving, by an Artificial Intelligence (AI) system a communication from a first device. The method also includes identifying a keyword in the communication that indicates the communication is intended for a subset of users monitoring the common communications channel. The method also includes retrieving an encryption key associated with the subset of users. The method also includes encrypting the communication using the encryption key. The method also includes sending the encrypted communication over the common communications channel, wherein only a second device associated with the subset of users and including the encryption key associated with the subset of users is able to decrypt the encrypted communication.

In one aspect the method further includes decrypting the communication by the second device and unmuting the second device to playout the communication.

A system for directing a communication on a common communications channel to a specific group is provided. The system includes a processor and a memory coupled to the processor. The memory includes a set of instructions thereon that when execute by the processor cause the processor to receive, by an Artificial Intelligence (AI) system a communication from a first device. The instructions also cause the processor to identify a keyword in the communication that indicates the communication is intended for a subset of users monitoring the common communications channel. The instructions also cause the processor to retrieve an encryption key associated with the subset of users. The instructions also cause the processor to encrypt the communication using the encryption key. The instructions also cause the processor to send the encrypted communication over the common communications channel, wherein only a second device associated with the subset of users and including the encryption key associated with the subset of users is able to decrypt the encrypted communication.

In one aspect the instructions further cause the processor to decrypt the communication by the second device and unmute the second device to playout the communication.

A non-transitory processor readable medium containing a set of instructions thereon for directing a communication on a common communications channel to a specific group is provided. The instructions on the medium, that when executed by the processor cause the processor to receive, by an Artificial Intelligence (AI) system a communication from a first device. The instructions on the medium also cause the processor to identify a keyword in the communication that indicates the communication is intended for a subset of users monitoring the common communications channel. The instructions on the medium also cause the processor to retrieve an encryption key associated with the subset of users. The instructions on the medium also cause the processor to encrypt the communication using the encryption key. The instructions on the medium also cause the processor to send the encrypted communication over the common communications channel, wherein only a second device associated with the subset of users and including the encryption key associated with the subset of users is able to decrypt the encrypted communication.

In one aspect the instructions on the medium further cause the processor to decrypt the communication by the second device and unmute the second device to playout the communication.

In one aspect the keyword is a phrase. In one aspect the encryption is not performed on a subsequent communication when the keyword is not identified. In one aspect the first and second device are part of a land mobile radio (LMR) system. In one aspect there are at least two subsets of users, wherein each of the at least two subsets of users have different keywords, wherein each of the at least two subsets of users is associated with a different encryption key.

Further advantages and features consistent with this disclosure will be set forth in the following detailed description, with reference to the figures.

FIG. 1 is an example of a system 100 wherein the directing a communication on a common channel to a specific group techniques described herein may be implemented. The system includes radio infrastructure 110, base station 120, and a plurality of radio devices 130, 132, 134.

The radio infrastructure 110 may be any currently known or later developed radio communications system. For example, the radio infrastructure may implement a Project 25 (P25) LMR system. The radio infrastructure may implement a TETRA LMR system. The techniques described herein are not limited to any particular technology. What should be understood is that the radio infrastructure receives incoming PTT calls 162 from a radio unit 130, 132, 134 via the base station 120. The radio unit is associated with a talkgroup. The radio infrastructure may then cause the received communication to be sent to all other radios who are also assigned to the same talkgroup.

The radio infrastructure is equipped with an encryption system 114. An example of a hardware device that may implement the encryption system is described with respect to FIG. 4. As will be described in further detail below, the encryption system may include a Natural Language Processing (NLP) or trained Artificial Intelligence model that is used to detect keywords or phrases in the incoming communication. The encryption system 114 is also able to encrypt the incoming communication prior to it being sent out to the other radios.

The system 100 also includes a base station 120. The base station includes Radio Frequency (RF) equipment that allows for wireless communications between the radios 130, 132, 134 and the base station. For example, the base station may utilize an uplink frequency that allows for communication from a single radio at a time. The base station may utilize a downlink frequency to broadcast a communication to all radios within the coverage area of the base station. Operation of a base station in LMR systems is well known.

The system 100 may also include a plurality of radios 130, 132, 134 utilized by first responders. The radios can be mobile radios (e.g. mounted in a vehicle, etc.) or portable radios (e.g. walkie talkies, etc.). An example of a hardware device that may implement a radio is described with respect to FIG. 5. The particular form factor of the radios is relatively unimportant. Each radio may be associated with a talkgroup. When a PTT button on the radio is pressed, the user may begin speaking, and the communication is sent over an uplink channel to the base station 120. The communication is then sent by the base station to the radio infrastructure 110 where it is then duplicated and sent back to the base station. The base station may then send the communication, using a downlink channel, to all other radios within the coverage area of the base station that are associated with the talkgroup.

In the example, depicted with respect to FIG. 1, there are three types of first responders as depicted by legend 125. Police responders are indicated with a square shape, Fire responders are indicated with a circle shape, and EMS responders are indicated with a triangle shape. As shown, there are police responder radios 130-1 . . . *n*, fire responders 132-1 . . . *n*, and EMS responders 130-1 . . . *n*.

For purposes of this example, assume all of the first responder radios are configured to be in a single talkgroup. Thus, when the PTT button is pressed on one of the radios 130-1, the resulting communication is sent to, and heard by, all of the radios 130, 132, 134, absent the techniques described herein. Furthermore, assume each radio is configured with an encryption key that is associated with the role of the user assigned to the radio. For example, all radios 130 are associated with the role of police and as such, all police radios will be equipped with the same encryption key. The same applies to the fire and EMS radios. Use of the encryption key is described in further detail below.

In operation, a user of radio may initiate a PTT communication. For example, the police user of radio 130-1 may initiate a communication by pressing the PTT button on their radio and then begin speaking (e.g. immediately, after talk permit tone received, etc.). For purposes of the initial example, assume that the user of radio 130-1 does not speak the keyword or phrase in the communication. For example, the communication may be, "Meet at the South side of the structure." This communication may be sent 160 from the radio 130-1 to the base station 120 via wireless RF communication. The base station may then forward the communication 162 to the radio infrastructure 110 where it is received by a receive interface 112 of the infrastructure.

The communication may then be sent to the encryption system 114. The encryption system, using NLP and AI models may analyze the communication to determine that there is no keyword or phrase present in the communication. As such, this means the communications is intended to be received by all radios in the talkgroup. The encryption system may then pass the communication, unencrypted, to a transmit interface 116 of the radio infrastructure 110. The radio infrastructure then transmits 164 the communication to the base station 120. The base station sends the communication 166, via wireless communication to all radios within the coverage area of the base station. Because the communication is not encrypted, all radios are able to play out the communication, thus achieving the purpose of having the communication heard by all members of the talkgroup, regardless of role.

However, in some cases, the communications may not be intended for every member of the talkgroup. Each defined role (e.g. police, fire, EMS, etc.) may be associated with a keyword or phrase. Each of those keywords or phrases may be associated with an encryption key. The radios 130, 132,

134 that are assigned to a user with particular role are also configured with the encryption key designated for the role. For example, the keyword "police" or phrase "all police officers" may be associated with the role of police officer. All other roles will have their own similar keyword or phrase.

A user may begin a communication that includes the keyword. For example, a police officer associated with radio 130-1 may press the PTT button on the radio and say, "All police officers, meet at the south side of the structure." As should be clear, the communication is intended for those radios associated with users who are police officers. Just as in the previous example, the communication 160 may be sent to the base station 120 over an uplink channel. The communication again may be sent 162 to the radio infrastructure 110 via a receive interface 112 of the radio infrastructure.

The encryption system 114 may receive the communication, and using NLP and AI models, determine that the communication includes a keyword or phrase. In the present example, the phrase detected is "All police officers" and this can be detected in the incoming communication. As mentioned above, each keyword or phrase is associated with an encryption key. Once the keyword or phrase is identified, the communication may be encrypted with that encryption key.

It should be understood that although being referred to with encryption terminology, this does not necessarily mean that encrypted communications are unintelligible. Rather, it is intended to reflect any process where a communication is scrambled in such a way using a mechanism that requires knowledge of the encryption process used in order to decrypt the communication. For example, in symmetric key encryption, a communication that is encrypted with a given key can only be decrypted using the same key. In public-private key encryption, a communication encrypted with a public key can only be decrypted using the corresponding private key (and vice versa).

The use of encryption keys as described above generally applies to digital communications, wherein the communication is first digitized and then sent wirelessly. However, other similar techniques may also be used on analog channels. For example, Continuous Tone-Coded Squelch Systems (CTCSS) provide a mechanism where a sub-audible tone is appended to a communication. A radio receiving such a communication extracts the sub-audible tone and determines if the radio is associated with that particular tone. If so, the communication is played, it not the communication is muted.

What should be understood is that encryption refers to any technique where a communication can be encrypted based on some key associated with a keyword or phrase. That communication can then be unencrypted with a key corresponding to the key used to encrypt the communication. This is not intended to imply that the keys used to encrypt/ unencrypt are the same, but rather the functionality provided.

The encryption system 114 may then utilize the transmit interface 116 of the radio infrastructure to send 164 the encrypted communication to the base station 120. The base station then sends 166 the encrypted communication to all of the radios 130, 132, 134 within the coverage area of the base station via a downlink channel.

Each radio 130, 132, 134 may then attempt to unencrypt the encrypted communication using an encryption that was associated with the radio when the radio was originally added to the talkgroup. If the unencrypting process is successful, then this means the communication was initially encrypted with a key that is associated with the same role as the user of the radio, and thus the communication was intended for that user. If the unencrypting process is unsuccessful, the radio is not associated with the role for which this communication was intended.

Continuing with the previous example, the initial communication was intended for all people with the role of police. Thus, when encrypted, the encryption key would be one that is associated with police officers and which would also be configured into police radios 130-1 . . . *n*. Thus when those radios attempt to decrypt the communication, the process will be successful. The other devices, such as radios 132 associated with fire and radios 134 associated with EMS would not be configured with the encryption keys needed to decrypt the communication. As such, they would not be able to decrypt the communication and would thus remain muted. The result being, those users would not receive the communication because it was not intended for them.

It should further be understood that the techniques described herein are not limited to individual roles. For example, there may be a key phrase "All police and EMS" which is associated with all police and EMS users on the talkgroup. In some implementations, there may be an encryption key associated with all possible combinations of users. In other implementations, the encryption system may send the encrypted communication multiple times, each time encrypted with the key for that particular role. In the present example, the communication could be sent encrypted with a key associated with police and then sent again encrypted with a key associated with EMS. The process described above then occurs, with each radio attempting to unencrypt the communication with the encryption keys associated with that radio.

FIG. 2 is an example of a flow chart 200 of an implementation of the techniques described herein from a network perspective. In block 205, an AI system receives a communication from a first device. As described above, in one implementation the AI may receive a communication from one of the radios deployed in the field. The communication may be routed from the radio, to a base station, and then to the radio infrastructure.

In block 210, a keyword in the communication is identified. The keyword indicates that the communication is intended for a subset of users monitoring the common communications channel. As described, in order to reduce the complexity of configuration, in some cases all users of the system, regardless of role, may be placed in a single communications channel. In some cases, it may be desired to send the communication to a subset of those users. For example, it may be desired to send the communication to users assigned to a particular role. A keyword may be associated with the role. Identifying the keyword in the communication indicates to the AI system that the communication is intended for a subset of people using the communications channel. Although the subset may include a particular role, it should be understood that the subset could include multiple roles, but not all roles (e.g. police and fire, but not Ems, etc.).

In block 215, the keyword is a phrase. In some cases, the key word may be a phrase that makes it more clear that the communication is intended for users of a specific role. For example, instead of the keyword being "Police" the keyword may be the phrase, "All Police" or "All Police Only". The use of a phrase may make it easier for the AI system to determine that the communication is actually intended for a particular susbset of people, rather than the keyword having been included for other reasons. For example, the communication may have been, "Police are on scene" and this was intended to be heard by everyone on the common communications channel. Use of the keyword "Police" alone may cause ambiguity, as it is possible the communication is intended for all users. The use of a phrase, such as "All Police Only" makes clear that the communication is only intended for the specific subset of users (e.g. Police only, etc.).

In block 220, an encryption key associated with the subset of users is retrieved. As explained above, various forms of encryption may be used to ensure that a communication that is encrypted with a key can only be decrypted by a user whose device (e.g. radio, etc.) is associated with an appropriate key to decrypt. For example, in a public-private key system, a communication encrypted with a private key can only be decrypted using a corresponding public key. Each subset of users is associated with an encryption key for that particular subset of users (e.g. specific role, etc.).

In block 225, there are at least two subsets of users. Each of the at least two subsets of users have different keywords. Each of the at least two subsets of users is associated with a different encryption key. In some cases, the communication may be intended for two different subsets of users, but not all users (e.g. police and fire, but not EMS, etc.). Each of the subsets of users may be associated with their own encryption key. In one possible implementation, the communication is encrypted with each subset of user's encryption keys. For example, The communication may be duplicated and encrypted with the encryption key of each subset of users. In other words, the communication is encrypted twice and sent twice, with each subset of users able to use their own associated encryption key to decrypt the communication.

In another possible implementation, multiple subsets of users may be grouped, and the groups each associated with their own keyword/phrase and associated encryption key. For example, the "Police" keyword may be associated with a first encryption key, the "Fire" keyword may be associated with a second encryption key, and the "Police and Fire" phrase may be associated with a third encryption key. Thus, communications intended for both the Police and Fire subsets of users may use the third encryption key.

In block 230, the communication is encrypted using the encryption key. As explained above, once encrypted with the encryption key, the communication can only be decrypted by an entity that has an encryption key associated with the encryption key used to encrypt the communication. The specific encryption technique used is relatively unimportant. Any technique that prevents users who are not associated with the appropriate encryption key from decrypting the communication are suitable for use with the techniques described herein.

In block 235, the encryption is not performed on a subsequent communication when the keyword is not identified. In other words, the techniques described herein are applied on a per call (e.g. per PTT button press, etc.). If a user presses the PTT button, and specifies a keyword indicating the communication is intended for a subset of the users, the encryption techniques described herein are applied. However, once that particular call ends (e.g. PTT button released, etc.) a subsequent call (e.g. PTT button pressed again, etc.) will not cause the techniques described herein to be applied, unless a keyword is detected. In other words, the techniques described herein are applied on a per call basis and to not persist between calls. Each new call requires speaking a keyword if the communication is intended to be restricted to a subset of users.

In block 240, the encrypted communication is sent over the common communications channel. Only a second device associated with the subset of users and including the encryption key associated with the subset of users is able to decrypt the encrypted communication. For example, if the communication was intended for a first subset of users and was encrypted using an encryption key associated with that first subset of users, only devices (e.g. radios, etc.) that are provisioned with the correct encryption key associated with the first subset of users are able to decrypt the encrypted communication. All other devices belonging to users that are not in the first subset of users will not be associated with the proper encryption key and will thus be unable to decrypt the encrypted communication.

In block 245, the first and second device are part of a Land Mobile Radio (LMR) system. As mentioned above, LMR systems are typically used by public safety agencies due to their need for highly reliable mission critical communications. However, it should be understood that the techniques described herein are not limited to LMR systems. The techniques described herein can be used on any type of system that utilizes a common communications channel where multiple subsets of users exist.

In block 250, the communication is decrypted by the second device. Because only devices associated with the correct encryption key for the subset of users will be able to successfully decrypt the encrypted communication, only those devices will be able to play the encrypted communication to their associated user. All other devices will not be able to decrypt the communication and may either mute their output or provide an indication that the channel is currently busy (to prevent other users from attempting to initiate a new call).

In block 255, the second device is unmuted to playout the communication. Once the second device, that is associated with the encryption key for the desired subset of users is able to decrypt the communication, the device knows that communication was intended for the user of the device. The device then unmutes and plays the unencrypted communication to the user. As should be clear, the unencrypted communication is not played out on devices that were unable to decrypt the encrypted communication.

FIG. 3 is an example of a flow chart 300 of an implementation of the techniques described herein from a radio device perspective. In block 305, a communication is received at a device. The communication is received over a shared communications channel. As described with respect to FIG. 1, the communication may have been sent via the base station 120 to all the radios 130, 132, 134 over a shared communications channel that is received by all of the radios.

In block 310, it is determined if the communication is encrypted. As explained above, there are many techniques that can be used to determine if a communication is encrypted. The techniques described herein are not dependent on any particular type of encryption. Each type of encryption may include an indication as to if the communication is encrypted. For example, the communication may include an indicator that the communication is encrypted, which may also include the type of encryption applied.

In block 315, if it is determined that the communication is not encrypted, the process moves to block 320. Otherwise, if encrypted, the process moves to block 325.

In block 320, the communication is played out when it is not encrypted. As explained above, all radios are using the same shared communications channel (e.g. talkgroup, etc.). By design, if a communication is sent on that shared communications channel in an unencrypted form, all radios using the shared communications channel are able to play the communication to their respective users. As explained above, use of the shared communications channel reduces the need to configure each radio.

In block 325, the device attempts to decrypt the communication using an encryption key associated with the device. Each device is associate with a user, and that user has a role. Each role may be associated with an encryption key. When the radio is configured, the encryption key associated with that role may be provisioned into the device. In some cases, the device may be associated with more than one role, and thus may have multiple encryption keys stored in the device. A communication that has been encrypted can only be decrypted using an appropriate encryption key. The techniques described herein are not limited to any particular type of encryption. What should be understood is that communications intended for a radio assigned to a user having a specific role are encrypted in such a way that the encryption key associated with the device is usable to decrypt communications intended for that role.

In block 330, it is determined if the decryption was successful. If not, the process moves to block 335. If the decryption is successful, the process moves to block 340.

In block 335, the device is muted when the decryption is unsuccessful. An unsuccessful decryption means that the communication was encrypted using a key that is not associated with the role of the device. In other words, the communication was not intended to include the user of the device (e.g. communication encrypted with police key, device user is EMS, etc.). Thus, because the communication is not intended for the role of the user of the device, the device may simply mute, such that nothing is played out to the user. In an alternative implementation, a sound that is unintelligible (e.g. static, beeping noise, etc.) may be played out to convey that the shared communications channel is currently in use (e.g. playing out the communication to the intended recipients) in order to prevent the unintended recipients from attempting to initial a new communication. In other words, the unintelligible sound may be used to communicate to non-intended recipients that the shared communications channel is busy, but it is busy with communications intended for other members of the talkgroup.

In block 340, the communication is played out when the decryption is successful. As explained above, if the decryption is successful, this means that the communication was encrypted with a key associated with the role of the user of the device. As such, the communication was intended for the user of the device. The communication, once decrypted, can then be played out to the user as the user was an intended recipient of the communication.

Figure 4:
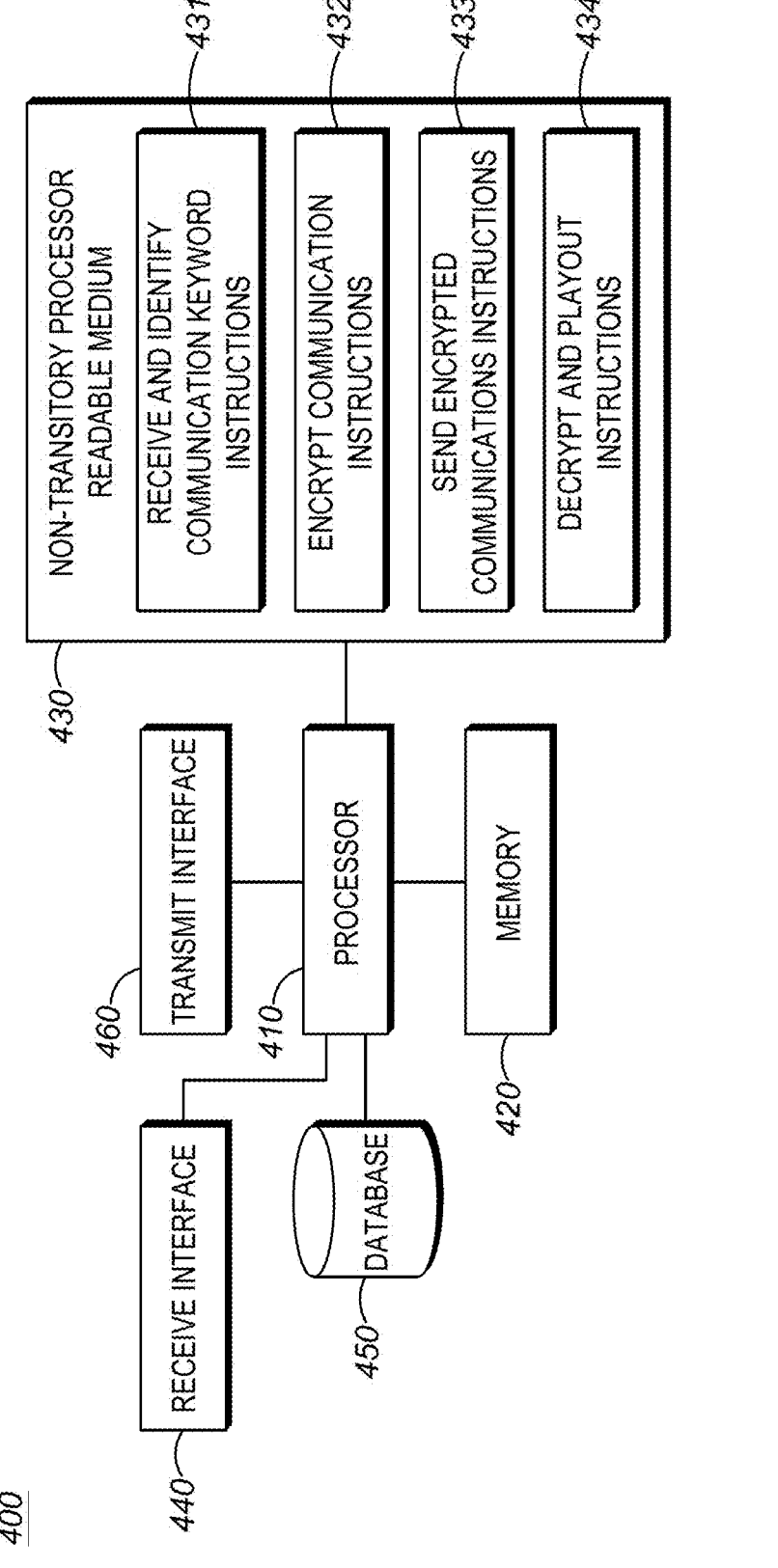
FIG. 4 is an example of a device that may implement the network portions of the techniques described herein.

FIG. 4 is an example of a device 400 that may implement the network portions of the techniques described herein. It should be understood that FIG. 4 represents one example implementation of a computing device that utilizes the techniques described herein. Although only a single processor is shown, it would be readily understood that a person of skill in the art would recognize that distributed implementations are also possible. For example, the various pieces of functionality described above (e.g. keyword detection, encryption, etc.) could be implemented on multiple devices that are communicatively coupled. FIG. 4 is not intended to imply that all the functionality described above must be implemented on a single device.

Device 400 may include processor 410, memory 420, non-transitory processor readable medium 430, receive interface 440, database interface 450, and transmit interface 460.

Processor 410 may be coupled to memory 420. Memory 420 may store a set of instructions that when executed by processor 410 cause processor 410 to implement the techniques described herein. Processor 410 may cause memory 420 to load a set of processor executable instructions from non-transitory processor readable medium 430. Non-transitory processor readable medium 430 may contain a set of instructions thereon that when executed by processor 410 cause the processor to implement the various techniques described herein.

For example, medium 430 may include receive and identify communication keyword instructions 431. The receive and identify communication keyword instructions 431 may cause the processor to monitor communications on the shared communications channel to identify the presence of a keyword or phrase in a communication on the channel. For example, the processor may utilize the receive interface 440 to monitor communications on the shared communications channel (e.g. via receive interface 112, etc.). The receive and identify communication keyword instructions 431 may also cause the processor to identify keywords or phrases in the communication on the shared communication channel by implementing the AI or natural language processing techniques described above. The processor may access the database 450 to retrieve the keywords or phrases that are associated with each type of user that are stored therein. The receive and identify communication keyword instructions 431 are described throughout this description generally, including places such as the description of blocks 205-215.

The medium 430 may include encrypt communications instructions 432. The encrypt communications instructions 432 may cause the processor to encrypt the communication using an encryption key associated with the keyword or phrase associated with the identified type of user. For example, the processor may access the database 450 to retrieve the encryption key associated with the keyword or phrase and use that retrieved encryption key to encrypt the communication. The encrypt communications instructions 432 are described throughout this description generally, including places such as the description of blocks 220-235.

The medium 430 may include send encrypted communications instructions 433. The send encrypted communications instructions 433 may cause the processor to send the encrypted communications to the radios on the shared communications channel. For example, the processor may use the transmit interface (e.g. via transit interface 116, etc.). The send encrypted communications instructions 433 are described throughout this description generally, including places such as the description of blocks 240 and 245.

The medium 430 may include decrypt and playout instructions 434. The decrypt and playout instructions 434 may cause the processor to send the encrypted communication to the devices on the shared communications channel, wherein those devices will attempt to decrypt the encrypted communication, and if successful, play out the encrypted communication. The decrypt and playout instructions 434 are described throughout this description generally, including places such as the description of blocks 250 and 255.

Figure 5:
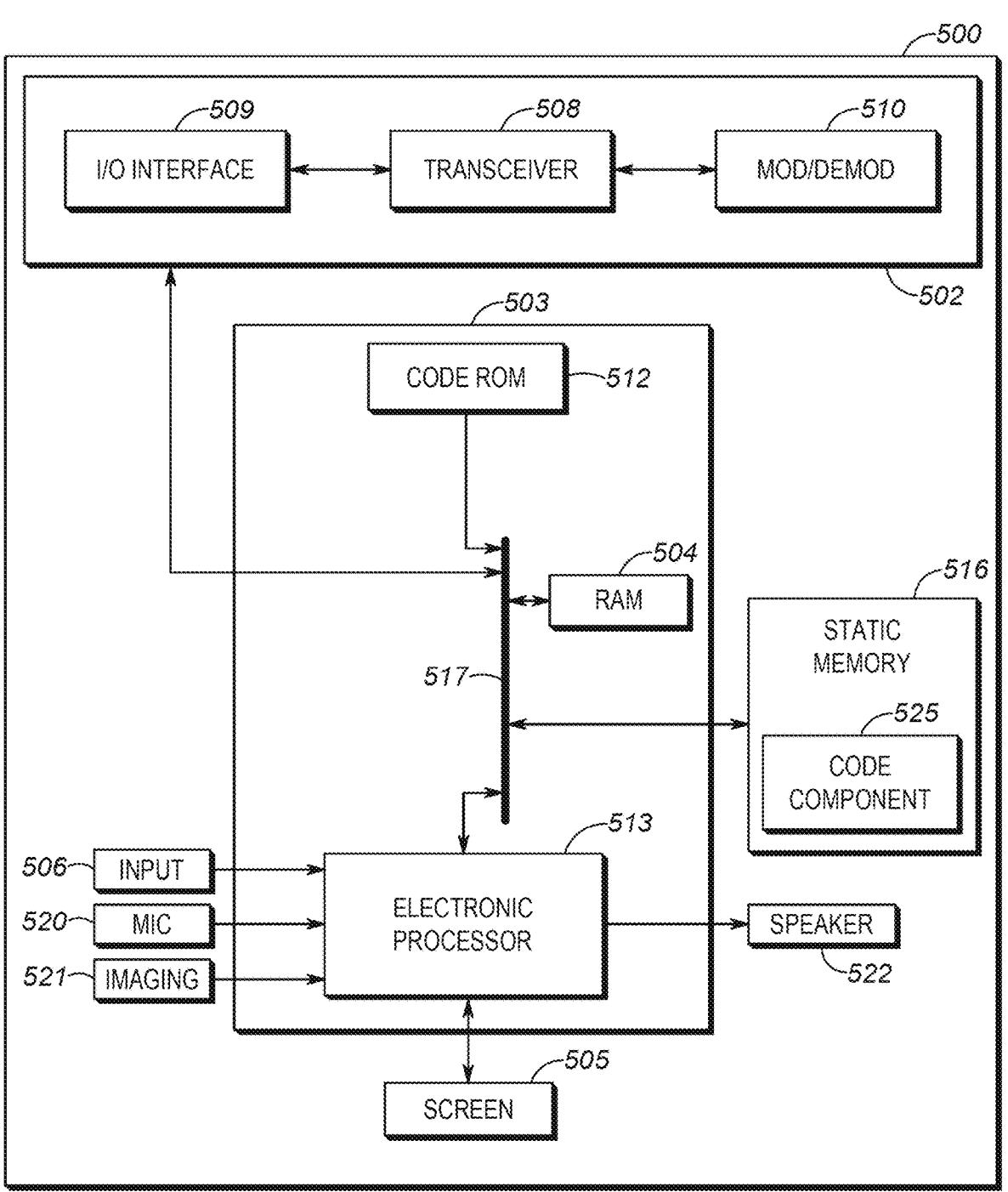
FIG. 5 is an example of a radio device that may implement the radio portions of the techniques described herein.

FIG. 5 is an example of a communication device 500 that may implement the radio portions of the techniques described herein. The communication device 500 may be, for example, embodied in the radios 130, 132, 134 and/or may be a distributed communication device across two or more of the foregoing (or multiple of a same type of one of the foregoing) and linked via a wired and/or wireless communication link(s). In some embodiments, the communication device 500 may be communicatively coupled to other devices such as the base station 120 as described above.

While FIG. 5 represents the communication devices described above with respect to FIG. 1, depending on the type of the communication device, the communication device 500 may include fewer or additional components in configurations different from that illustrated in FIG. 5. For example, in some embodiments, communication device 500 acting as the radio 130, 132, 134 may not include one or more of the screen 505, input device 506, and imaging device 521. As another example, in some embodiments, the communication device 500 acting as the radio 130, 132, 134 may further include a location determination device (for example, a global positioning system (GPS) receiver). Other combinations are possible as well.

As shown in FIG. 5, communication device 500 includes a communications unit 502 coupled to a common data and address bus 517 of a processing unit 503. The communication device 500 may also include one or more input devices (e.g., keypad, pointing device, touch-sensitive surface, etc.) 506 and an electronic display screen 505 (which, in some embodiments, may be a touch screen and thus also act as an input device 506), each coupled to be in communication with the processing unit 503.

The microphone 520 may be present for capturing audio from a user and/or other environmental or background audio that is further processed by processing unit 503 in accordance with the remainder of this disclosure and/or is transmitted as voice or audio stream data, or as acoustical environment indications, by communications unit 502 to other portable radios and/or other communication devices. The imaging device 521 may provide video (still or moving images) of an area in a field of view of the communication device 500 for further processing by the processing unit 503 and/or for further transmission by the communications unit 502. A speaker 522 may be present for reproducing audio that is decoded from voice or audio streams of calls received via the communications unit 502 from other portable radios, from digital audio stored at the communication device 500, from other ad-hoc or direct mode devices, and/or from an infrastructure RAN device, or may playback alert tones or other types of pre-recorded audio.

The processing unit 503 may include a code Read Only Memory (ROM) 512 coupled to the common data and address bus 517 for storing data for initializing system components. The processing unit 503 may further include an electronic processor 513 (for example, a microprocessor or another electronic device) coupled, by the common data and address bus 517, to a Random Access Memory (RAM) 504 and a static memory 516.

The communications unit 502 may include one or more wired and/or wireless input/output (I/O) interfaces 509 that are configurable to communicate with other communication devices, such as the base station 120.

For example, the communications unit 502 may include one or more wireless transceivers 508, such as a DMR transceiver, a P25 transceiver, a Bluetooth® transceiver, a Wi-Fi® transceiver perhaps operating in accordance with an IEEE 802.11 standard (e.g., 802.11a, 802.11b, 802.11g), an LTE transceiver, a WiMAX® transceiver perhaps operating in accordance with an IEEE 802.16 standard, and/or another similar type of wireless transceiver configurable to communicate via a wireless radio network.

The communications unit 502 may additionally or alternatively include one or more wireline transceivers 508, such as an Ethernet transceiver, a USB transceiver, or similar transceiver configurable to communicate via a twisted pair wire, a coaxial cable, a fiber-optic link, or a similar physical connection to a wireline network. The transceiver 508 is also coupled to a combined modulator/demodulator 510.

The electronic processor 513 has ports for coupling to the display screen 505, the input device 506, the microphone 520, the imaging device 521, and/or the speaker 522. Static memory 516 may store operating code 525 for the electronic processor 513 that, when executed, performs one or more of the steps set forth in FIG. 3 and accompanying text.

The static memory 516 may comprise, for example, a hard-disk drive (HDD), an optical disk drive such as a compact disk (CD) drive or digital versatile disk (DVD) drive, a solid state drive (SSD), a flash memory drive, or a tape drive, and the like.

Example embodiments are herein described with reference to flowchart illustrations and/or block diagrams of methods, apparatus (systems) and computer program products according to example embodiments. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a special purpose and unique machine, such that the instructions, which execute via the processor of the computer or other programmable data processing apparatus, create means for implementing the functions/acts specified in the flowchart and/or block diagram block or blocks. The methods and processes set forth herein need not, in some embodiments, be performed in the exact sequence as shown and likewise various blocks may be performed in parallel rather than in sequence. Accordingly, the elements of methods and processes are referred to herein as "blocks" rather than "steps."

These computer program instructions may also be stored in a computer-readable memory that can direct a computer or other programmable data processing apparatus to function in a particular manner, such that the instructions stored in the computer-readable memory produce an article of manufacture including instructions which implement the function/act specified in the flowchart and/or block diagram block or blocks.

The computer program instructions may also be loaded onto a computer or other programmable data processing apparatus that may be on or off-premises, or may be accessed via the cloud in any of a software as a service (SaaS), platform as a service (PaaS), or infrastructure as a service (IaaS) architecture so as to cause a series of operational blocks to be performed on the computer or other programmable apparatus to produce a computer implemented process such that the instructions which execute on the computer or other programmable apparatus provide blocks for implementing the functions/acts specified in the flowchart and/or block diagram block or blocks. It is contemplated that any part of any aspect or embodiment discussed in this specification can be implemented or combined with any part of any other aspect or embodiment discussed in this specification.

As should be apparent from this detailed description above, the operations and functions of the electronic computing device are sufficiently complex as to require their implementation on a computer system, and cannot be performed, as a practical matter, in the human mind. Electronic computing devices such as set forth herein are understood as requiring and providing speed and accuracy and complexity management that are not obtainable by human mental steps, in addition to the inherently digital nature of such operations (e.g., a human mind cannot interface directly with RAM or other digital storage, cannot transmit or receive electronic messages, electronically encoded video, electronically encoded audio, etc., and cannot implement an artificial intelligence to identify a keyword and then subsequently encrypt a communication on a shared communications channel with an encryption key, among other features and functions set forth herein).

In the foregoing specification, specific embodiments have been described. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of present teachings. The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

Moreover in this document, relational terms such as first and second, top and bottom, and the like may be used solely to distinguish one entity or action from another entity or action without necessarily requiring or implying any actual such relationship or order between such entities or actions. The terms "comprises," "comprising," "has", "having," "includes", "including," "contains", "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a", "has . . . a", "includes . . . a", "contains . . . a" does not, without more constraints, preclude the existence of additional identical elements in the process, method, article, or apparatus that comprises, has, includes, contains the element. Unless the context of their usage unambiguously indicates otherwise, the articles "a," "an," and "the" should not be interpreted as meaning "one" or "only one." Rather these articles should be interpreted as meaning "at least one" or "one or more." Likewise, when the terms "the" or "said" are used to refer to a noun previously introduced by the indefinite article "a" or "an," "the" and "said" mean "at least one" or "one or more" unless the usage unambiguously indicates otherwise.

Also, it should be understood that the illustrated components, unless explicitly described to the contrary, may be combined or divided into separate software, firmware, and/or hardware. For example, instead of being located within and performed by a single electronic processor, logic and processing described herein may be distributed among multiple electronic processors. Similarly, one or more memory modules and communication channels or networks may be used even if embodiments described or illustrated herein have a single such device or element. Also, regardless of how they are combined or divided, hardware and software components may be located on the same computing device or may be distributed among multiple different devices. Accordingly, in this description and in the claims, if an apparatus, method, or system is claimed, for example, as including a controller, control unit, electronic processor, computing device, logic element, module, memory module, communication channel or network, or other element configured in a certain manner, for example, to perform multiple functions, the claim or claim element should be interpreted as meaning one or more of such elements where any one of the one or more elements is configured as claimed, for example, to make any one or more of the recited multiple functions, such that the one or more elements, as a set, perform the multiple functions collectively.

It will be appreciated that some embodiments may be comprised of one or more generic or specialized processors (or "processing devices") such as microprocessors, digital signal processors, customized processors and field programmable gate arrays (FPGAs) and unique stored program instructions (including both software and firmware) that control the one or more processors to implement, in conjunction with certain non-processor circuits, some, most, or all of the functions of the method and/or apparatus described herein. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used.

Moreover, an embodiment can be implemented as a computer-readable storage medium having computer readable code stored thereon for programming a computer (e.g., comprising a processor) to perform a method as described and claimed herein. Any suitable computer-usable or computer readable medium may be utilized. Examples of such computer-readable storage mediums include, but are not limited to, a hard disk, a CD-ROM, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory) and a Flash memory. In the context of this document, a computer-usable or computer-readable medium may be any medium that can contain, store, communicate, propagate, or transport the program for use by or in connection with the instruction execution system, apparatus, or device.

Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation. For example, computer program code for carrying out operations of various example embodiments may be written in an object oriented programming language such as Java, Smalltalk, C++, Python, or the like. However, the computer program code for carrying out operations of various example embodiments may also be written in conventional procedural programming languages, such as the "C" programming language or similar programming languages. The program code may execute entirely on a computer, partly on the computer, as a stand-alone software package, partly on the computer and partly on a remote computer or server or entirely on the remote computer or server. In the latter scenario, the remote computer or server may be connected to the computer through a local area network (LAN) or a wide area network (WAN), or the connection may be made to an external computer (for example, through the Internet using an Internet Service Provider).

The terms "substantially", "essentially", "approximately", "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "one of", without a more limiting modifier such as "only one of", and when applied herein to two or more subsequently defined options such as "one of A and B" should be construed to mean an existence of any one of the options in the list alone (e.g., A alone or B alone) or any combination of two or more of the options in the list (e.g., A and B together).

A device or structure that is "configured" in a certain way is configured in at least that way, but may also be configured in ways that are not listed.

The terms "coupled", "coupling" or "connected" as used herein can have several different meanings depending on the context in which these terms are used. For example, the terms coupled, coupling, or connected can have a mechanical or electrical connotation. For example, as used herein, the terms coupled, coupling, or connected can indicate that two elements or devices are directly connected to one another or connected to one another through intermediate elements or devices via an electrical element, electrical signal or a mechanical element depending on the particular context.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

What is claimed is:

1. A method for directing a communication on a common communications channel to a specific group comprising:

receiving, by an Artificial Intelligence (AI) system through the common communications channel, a communication from a first device;

identifying a keyword in the communication that indicates the communication is for a subset of users monitoring the common communications channel;

retrieving an encryption key associated with the subset of users, wherein there are at least two subsets of users, wherein each of the at least two subsets of users have a different keyword, and each of the at least two subsets of users is associated with a different encryption key;

encrypting the communication using the encryption key;

sending to a second device the encrypted communication over the common communications channel, wherein only the second device associated with the subset of users and including the encryption key associated with the subset of users is able to decrypt the encrypted communication;

decrypting the communication by the second device associated with the subset of users; and unmuting the second device to playout the communication.

2. The method of claim 1, wherein the keyword is a phrase.

3. The method of claim 1, wherein the encryption is not performed on a subsequent communication when the keyword is not identified.

4. The method of claim 1, wherein the first device and the second device are part of a land mobile radio (LMR) system.

5. A system for directing a communication on a common communications channel to a specific group comprising:

a processor; and a memory coupled to the processor, the memory containing a set of instructions thereon that when executed by the processor cause the processor to:

receive, by an Artificial Intelligence (AI) system through the common communications channel, a communication from a first device;

identify a keyword in the communication that indicates the communication is for a subset of users monitoring the common communications channel; retrieve an encryption key associated with the subset of users, wherein there are at least two subsets of users, wherein each of the at least two subsets of users have a different keyword, and each of the at least two subsets of users are associated with a different encryption key;

encrypt the communication using the encryption key; and send to a second device the encrypted communication over the common communications channel, wherein only the second device associated with the subset of users and including the encryption key associated with the subset of users is able to decrypt the encrypted communication, wherein the second device comprising one or more processors decrypts the communication; and unmute the second device to playout the communication.

6. The system of claim 5, wherein the keyword is a phrase.

7. The system of claim 5, wherein the encryption is not performed on a subsequent communication when the keyword is not identified.

8. The system of claim 5, wherein the first device and the second device are part of a land mobile radio (LMR) system.

9. A non-transitory computer-readable medium containing a set of instructions thereon for directing a communication on a common communications channel to a specific group that when executed by a processor cause the processor to:

receive, by an Artificial Intelligence (AI) system through the common communications channel, a communication from a first device;

identify a keyword in the communication that indicates the communication is for a subset of users monitoring the common communications channel;

retrieve an encryption key associated with the subset of users, wherein there are at least two subsets of users, wherein each of the at least two subsets of users have a different keyword, and each of the at least two subsets of users are associated with a different encryption key;

encrypt the communication using the encryption key; and send to a second device the encrypted communication over the common communications channel, wherein only the second device associated with the subset of users and including the encryption key associated with the subset of users is able to decrypt the encrypted communication, wherein the second device comprising one or more processors decrypts the communication; and unmute the second device to playout the communication.

10. The non-transitory computer-readable medium of claim 9, wherein the keyword is a phrase.

11. The non-transitory computer-readable medium of claim 9, wherein the encryption is not performed on a subsequent communication when the keyword is not identified.

12. The non-transitory computer-readable medium of claim 9, wherein the first device and the second device are part of a land mobile radio (LMR) system.

* * * * *